(12) United States Patent
Heald et al.

(10) Patent No.: US 8,702,844 B2
(45) Date of Patent: Apr. 22, 2014

(54) PARTICLE DOPED HOLLOW-FIBER CONTACTOR

(75) Inventors: Randall L. Heald, Bartlesville, OK (US); Clint P. Aichele, Bartlesville, OK (US); Imona C. Omole, Midland, TX (US); George F. Schuette, Ramona, OK (US); Sumod Kalakkunnath, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 256 days.

(21) Appl. No.: 13/448,857

(22) Filed: Apr. 17, 2012

(65) Prior Publication Data

US 2012/0285320 A1    Nov. 15, 2012

Related U.S. Application Data

(60) Provisional application No. 61/476,589, filed on Apr. 18, 2011.

(51) Int. Cl.
*B01D 53/22* (2006.01)

(52) U.S. Cl.
USPC .............. 95/49; 95/43; 95/45; 95/51; 95/149; 196/4; 196/8; 196/10

(58) Field of Classification Search
CPC ..... B01D 53/22; B01D 53/228; B01D 53/226
USPC ................. 95/43, 45, 49, 51, 149; 96/4, 8, 10
See application file for complete search history.

(56) References Cited

U.S. PATENT DOCUMENTS 4,708,800 A * 11/1987 Ichikawa et al. ......... 210/500.23
6,113,795 A *  9/2000 Subramaniam et al. ...... 210/651
6,562,110 B2 *  5/2003 Koros et al. .................... 96/4
6,953,493 B2 * 10/2005 Nakayama et al. ............ 95/51
7,153,344 B2 * 12/2006 Filippi et al. .................. 95/51
7,950,529 B2 *  5/2011 Kulkarni et al. ......... 210/500.39
8,146,593 B2 *  4/2012 Riecke ..................... 128/205.28
8,262,779 B2 *  9/2012 Liu et al. ...................... 96/11
8,317,906 B2 * 11/2012 Bansal .............................. 96/4
2002/0014154 A1 *  2/2002 Witzko et al. ................. 95/178
2003/0051874 A1 *  3/2003 Munson et al. ............... 166/265
2005/0067344 A1 *  3/2005 Tanaka et al. ................ 210/490
2008/0160357 A1 *  7/2008 Pashley et al. ................ 429/14
2010/0313758 A1 * 12/2010 Stevens et al. ................. 96/10
2011/0316181 A1 * 12/2011 Liu et al. .................... 264/45.5
2012/0225416 A1 *  9/2012 Yoshida et al. ................ 435/2
2012/0247327 A1 * 10/2012 Omole ........................... 95/51
2013/0333354 A1 * 12/2013 Hamad ......................... 60/274

FOREIGN PATENT DOCUMENTS

GB        2449165 A  * 11/2008
GB        2462178 A  *  2/2010
WO    WO 9804339 A1 *  2/1998

* cited by examiner

*Primary Examiner* — Jason M Greene
*Assistant Examiner* — Anthony Shumate
(74) *Attorney, Agent, or Firm* — Phillips 66 Company

(57) ABSTRACT

Methods and apparatus relate to recovery of carbon dioxide and/or hydrogen sulfide from a gas mixture. Separating of the carbon dioxide, for example, from the gas mixture utilizes a liquid sorbent for the carbon dioxide. The liquid sorbent contacts the gas mixture for transfer of the carbon dioxide from the gas mixture to the liquid sorbent. Contacting of the sorbent with the gas mixture and/or desorption of the carbon dioxide from the liquid sorbent utilize hollow-fiber contactors that have permeable walls and incorporate particles distinct from a remainder of the walls to influence wetting properties of the contactors.

20 Claims, 1 Drawing Sheet

PARTICLE DOPED HOLLOW-FIBER CONTACTOR

CROSS-REFERENCE TO RELATED APPLICATIONS

This application is a non-provisional application which claims the benefit of and priority to U.S. Provisional Application Ser. No. 61/476,859 filed Apr. 18, 2011, entitled "Particle Doped Hollow-Fiber Contactor," which is hereby incorporated by reference in its entirety.

STATEMENT REGARDING FEDERALLY SPONSORED RESEARCH OR DEVELOPMENT

None

FIELD OF THE INVENTION

Embodiments of the invention relate to hollow-fiber contactors that incorporate additives to influence wetting properties.

BACKGROUND OF THE INVENTION

Desire to reduce greenhouse gas emissions in various industrial processes requires viable carbon dioxide mitigation strategies. Capture of the carbon dioxide depends on ability to separate the carbon dioxide from a mixture. Separation of the carbon dioxide from the mixture enables transport of the carbon dioxide and subsequent handling or sequestering of the carbon dioxide.

Factors determining suitability of possible techniques to separate the carbon dioxide include costs and energy requirements of the techniques. Energy intense separation approaches such as distillation are limited by thermodynamic constraints. Absorption processes utilize a sorbent to remove the carbon dioxide from the mixture followed by regeneration of the sorbent to liberate the carbon dioxide.

Prior absorption units utilize columns or towers for direct contacting of the mixture with an absorbent fluid such as an aqueous amine. However, percentage of the carbon dioxide within the mixture and/or amount of the carbon dioxide removed dictate size, operating expense and capital expense of the units. Viability of these absorption units that may contain inefficient mass transfer devices such as trays begins to diminish as the amount of the carbon dioxide to be separated scales up.

Therefore, a need exists for systems and methods of using hollow-fiber contactors as efficient mass transfer devices in absorption systems for carbon dioxide separation.

BRIEF SUMMARY OF THE DISCLOSURE

In one embodiment, a method of recovering carbon dioxide and/or hydrogen sulfide includes passing a gas containing at least one of carbon dioxide and hydrogen sulfide along hollow-fiber contactors. The method further includes passing a liquid sorbent for at least one of the carbon dioxide and the hydrogen sulfide along the contactors such that contacting of the gas and the liquid sorbent to treat the gas occurs across walls of the contactors. The contactors incorporate particles distinct in composition from a remainder of the walls to influence wetting properties of the contactors.

According to one embodiment, a method of recovering carbon dioxide includes transferring carbon dioxide from a gas mixture to a liquid sorbent through a first hollow-fiber contactor that incorporates first non-polymeric particles to influence wetting properties of the first hollow-fiber contactor. Further, the method includes transferring the carbon dioxide from the liquid sorbent to steam through a second hollow-fiber contactor that incorporates second non-polymeric particles to influence wetting properties of the second hollow-fiber contactor. Condensing the steam separates the carbon dioxide transferred to the steam.

For one embodiment, a system for recovering carbon dioxide and/or hydrogen sulfide includes a sorption unit having a first hollow-fiber contactor in fluid communication with a sorbent and a mixture containing at least one of carbon dioxide and hydrogen sulfide for transfer of at least one of the carbon dioxide and the hydrogen sulfide through pores of the first hollow-fiber contactor to the sorbent. A desorption unit includes a second hollow-fiber contactor in fluid communication with a circulation flow path loop that couples the sorption and desorption units with the sorbent. The first and second hollow-fiber contactors incorporate particles distinct from a remainder of the contactors to influence wetting properties thereof.

BRIEF DESCRIPTION OF THE DRAWINGS

A more complete understanding of the present invention and benefits thereof may be acquired by referring to the following description taken in conjunction with the accompanying drawings.

DETAILED DESCRIPTION

Embodiments of the invention relate to recovery of carbon dioxide and/or hydrogen sulfide from a gas mixture, such as flue gas or natural gas that may be recovered as hydrocarbon production from a sour gas field. While described herein with respect to carbon dioxide recovery, systems and methods disclosed also enable hydrogen sulfide ($H_2S$) recovery along with the carbon dioxide or in a same manner as the carbon dioxide recovery, if the hydrogen sulfide is present in the gas mixture either with or without the carbon dioxide. Separation of the carbon dioxide from the gas mixture utilizes a liquid sorbent for the carbon dioxide.

The liquid sorbent contacts the gas mixture for transfer of the carbon dioxide from the gas mixture to the liquid sorbent, which may be aqueous amine solutions or ionic liquids. The carbon dioxide then desorbs from the liquid sorbent upon heating of the liquid sorbent. Contacting of the sorbent with the gas mixture and/or desorption of the carbon dioxide from the liquid sorbent utilize hollow-fiber contactors that that have permeable walls and incorporate particles distinct from a remainder of the walls to influence wetting properties of the contactors.

Particles can be composed of carbon or more particularly carbon nanoparticles. In other variations the particles can be carbon nanoparticles and their chemically modified variations. Examples of some chemically modified variations include: particles with carboxylic, hydroxyl, amine type of functionalities.

In an alternate embodiment the particles can also be composed of fluorinated particles such as polytetrafluoroethylene. Usage of asymmetric hollow fibers with fluorinated particles results in an increase in breakthrough pressure in aggressive solvent environments without compromising high gas transfer rates.

Figure 1:
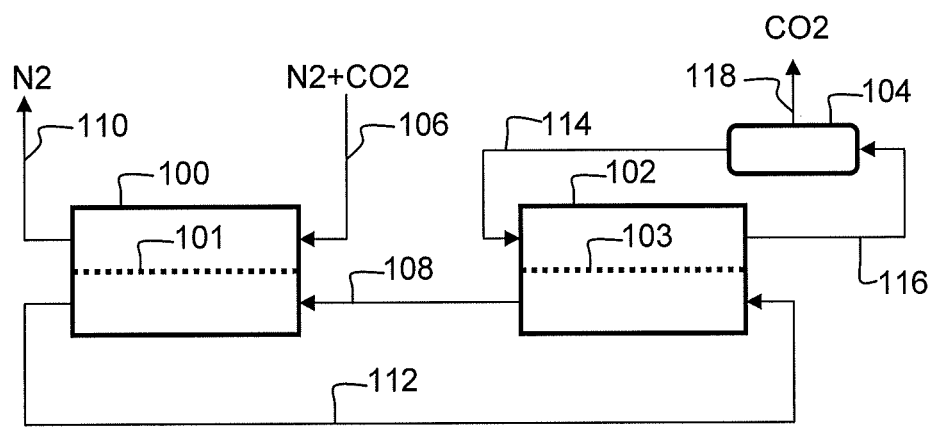
FIG. 1 is a schematic of a contactor system with hollow-fiber contactors having modified wetting properties utilized in sorption and desorption units for separating carbon dioxide from a gas mixture, according to one embodiment of the invention.

FIG. 1 illustrates a schematic of a contactor system including a sorption unit 100 and a desorption unit 102 coupled to a condenser and steam generator 104. In operation, a gas mixture 106, such as flue gas that contains nitrogen ($N_2$) and carbon dioxide ($CO_2$), enters the sorption unit 100. The gas mixture 106 passes through the sorption unit 100 along a flow path defined by a plurality of hollow-fiber sorption contactors (represented by a dotted line) 101 that enable contact of the gas mixture 106 with a liquid stream of lean sorbent 108 passing through the sorption unit 100.

The carbon dioxide in the gas mixture 106 diffuses across the hollow-fiber sorption contactors 101. This diffusion at least reduces concentration of the carbon dioxide in a resulting treated output 110 of the sorption unit 100 relative to concentration of the carbon dioxide in the gas mixture 106 that is input into the sorption unit 100. The lean sorbent 108 that sorbs the carbon dioxide transferred through the sorption contactors 101 exits the sorption unit 100 as rich sorbent 112 for feeding into the desorption unit 102.

Steam 114 passes through the desorption unit 102 along a flow path defined by a plurality of hollow-fiber desorption contactors (represented by a dotted line) 103 that enable contact of the rich sorbent 112 with the steam 114. Heat transfer from the steam 114 across the desorption contactors 103 liberates the carbon dioxide from the rich sorbent 112 regenerating the lean sorbent 108 supplied to the sorption unit 100. The steam 114 and the carbon dioxide transferred into the flow of the steam 114 exit the desorption unit 102 as a combined vapor stream 116 input into the condenser and steam generator 104.

In the condenser and steam generator 104, the carbon dioxide separates from liquid water upon cooling of the combined vapor stream 116 and steam condensation. Overhead of the carbon dioxide separated from the water forms a recovered carbon dioxide output 118. Subsequent heating of the water by the condenser and steam generator 104 produces the steam 114 that is recycled for feeding to the desorption unit 102.

Conventional passing of amines through a re-boiler for regeneration increases corrosion problems compared to use of the desorption unit 102 with the rich sorbent 112 in contact with the desorption contactors 103 that are less prone to corrosion. Further, the sorption and desorption units 100, 102 provide insensitivity to motion and orientation that influence prior contacting approaches. The sorption and desorption units 100, 102 thus function in applications including floating facilities that can move during operation.

Figure 2:
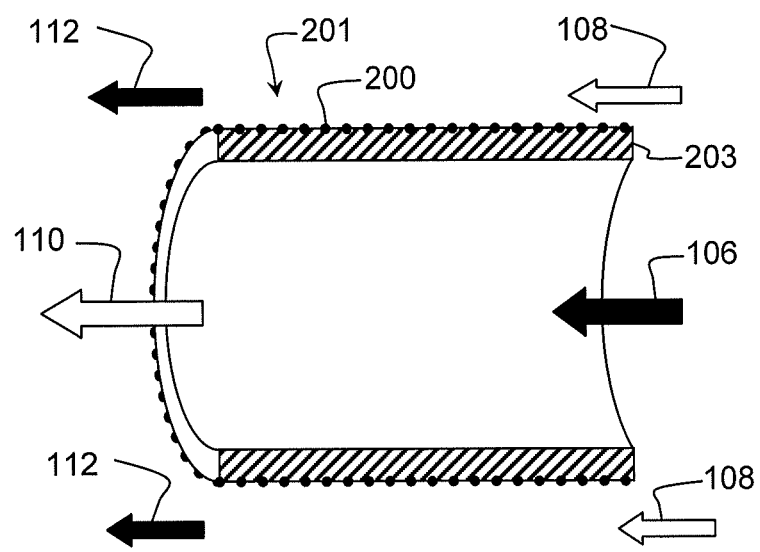
FIG. 2 is a cross-sectional representation of one of the hollow-fiber contactors that includes particles to provide the modified wetting properties, according to one embodiment of the invention.

FIG. 2 shows a cross-sectional representation of a single fiber 201 referred to herein as hollow-fiber due to having a cylindrical structure with an open interior bore and a diameter between about 200 microns and about 2 millimeters. Since the fiber 201 is permeable to gas, the contacting described herein occurs through pores in a wall of the fiber 201. For some embodiments, sizes of the pores range from about 0.1 nanometers to 1000 nanometers.

Multiple lengths of the fiber 201 assembled together may exemplify the contactors 101, 103 disposed in the units 100, 102 depicted in FIG. 1. For example, the gas mixture 106 containing the carbon dioxide may flow through the interior bore of the fiber 201 without being dispersed in the lean sorbent 108 flowing along an exterior of the fiber 201 and used for sorption of the carbon dioxide. In some embodiments, the lean sorbent 108 may flow through the interior bore of the fiber 201 without being dispersed in the gas mixture 106 flowing along the exterior of the fiber 201.

Packing density for multiple lengths of the fiber 201 and surface area of the fiber 201 enable efficient contacting. Compared with conventional packing that may provide only 250 square meters per cubic meter ($m^2/m^3$), the fiber 201 achieves surface areas of 1500 $m^2/m^3$ or more. The relative increase in surface area aides in reducing size and weight of equipment required for the contacting.

Pore size and hydrophobic properties of the fiber 201 maintain separation of a bulk gas phase (e.g., the gas mixture 106) from a bulk liquid phase (e.g., the lean sorbent 108). This non-dispersive flow through the sorption unit 100 or the desorption unit 102 avoids problematic issues including flooding, entrainment, channeling and foaming that often occur with dispersive contacting. The non-dispersive flow further enables control of gas and/or liquid flow rates without limitations of fluid-mechanics within towers that utilize the dispersive contacting.

The hydrophobic properties and the pore size help prevent liquids, such as the lean sorbent 108, from entering the fiber 201 since the sorbents are usually aqueous. As described herein, particulate 200 altering a surface of the fiber 201 contribute to the hydrophobic properties. Avoiding such liquid penetration or wetting of the fiber 201 ensures that a stagnant liquid layer within pores of the fiber 201 does not obstruct transport of the carbon dioxide through the wall of the fiber 201 since continuous flow otherwise replenishes fresh liquid flowing along the fiber 201.

In some embodiments, a hydrophobic polymeric material that can be processed into the hollow-fiber thus forms the fiber 201. Suitable materials that form the fiber 201 can dissolve in a spinning solvent, be cast into the fiber 201 and be compatible with sorbent formulations desired for use in removing the carbon dioxide. Various exemplary compositions of polymer that may form the fiber 201 satisfy foregoing criteria and include but are not limited to polysulfones, polyimides, polyethers, polycarbonates, fluoropolymers, or polymers of amides with various other constituent monomer combinations.

For some embodiments, a spinning process fabricates the fiber 201 from an extrusion mixture of the polymer (e.g., polyimide) and the solvent for the polymer. Examples of suitable solvents include N-methyl-2-pyrrolidone (NMP), dimethylformamide (DMF), dimethylacetamide (DMAc) and dimethyl sulfoxide (DMSO). These solvents provide miscibility in water that is high enough to promote phase separation during quenching of the extrusion mixture in an aqueous media while spinning. Concentration of the polymer in the extrusion mixture influences pore size and porosity given that pore size and porosity increase as the concentration of the polymer in the extrusion mixture decreases.

Examples of the particulate 200 include carbonaceous materials, such as silicon oxides, non-polymeric particulate or other materials distinct in composition from the polymer(s) forming a remainder of the fiber 201. The carbonaceous materials if used as the particulate 200 in the fiber 201 may have at least 85%, at least 90% or at least 95% carbon content by weight. Particle size of the particulate 200 may range from one nanometer, one micron, three micron, five micron, eight micron or even ten microns and may be smaller than the pores through the wall of the fiber 201 to avoid inhibiting mass transfer across the wall of the fiber 201.

The particulate 200 disperses on at least a surface of the fiber 201 in contact with liquids, such as the lean or rich sorbent 108, 112. Influence on the hydrophobic properties of the fiber 201 may derive from chemical composition of the particulate 200 and/or altering texture or morphology of the surface of the fiber 201 due to the particulate 200. For example, surface roughening increases hydrophobic tendency of the fiber 201 if already at least somewhat hydrophobic based on the polymer selected.

In some embodiments, the extrusion mixture includes the particulate 200 that is not dissolved in the solvent but rather suspended as solids in the mixture for incorporation into the fiber 201 to influence the wetting properties thereof. Preparing the fiber 201 by spinning a composition doped with the particulate 200 disperses the particulate 200 throughout the fiber 201. Some of the particulate 200 thus fix in position exposed on the inner and/or outer surfaces of the fiber 201 upon formation of the fiber 201.

Some embodiments apply the particulate 200 as a coating on the fiber 201. Such coating techniques include incipient wetness deposition or vapor deposition. The particulate 200 may coat an inside surface of the fiber 201, an outside surface of the fiber 201 or both the inside and outside surfaces of the fiber 201.

For example, a method of depositing a layer of the particulate 200 on a surface of the fiber 201 may include mixing materials that provide the particulate 200 with a fluid to form a suspension. The materials that provide the particulate 200 thus disperse in the fluid, such as water, which does not dissolve or degrade the material or a precursor spun from the polymer. Contacting the precursor for the fiber 201 with the suspension results in the materials that provide the particulate 200 migrating and adhering to the precursor in order to provide the fiber 201 coated with the particulate 200. Flowing of the suspension through an interior of the precursor may thereby coat an inner surface of the fiber 201 with the particulate 200. Once the precursor is contacted with the suspension and thereby loaded with the material, the fiber 201 may be dried to remove any of the fluid that remains.

For some embodiments, applying a voltage across the fiber 201 further influences the hydrophobic properties of the fiber 201. The particulate 200, may be conductive and form a network through the fiber 201 to enable application of the voltage. In some embodiments, forming the fiber 201 from conductive materials or carbonization of materials used to form the fiber 201 provides an electrical pathway along the fiber 201 and through which the voltage is applied.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method, comprising:
    passing a gas containing at least one of carbon dioxide and hydrogen sulfide along hollow-fiber contactors; and
    passing a liquid sorbent for at least one of the carbon dioxide and the hydrogen sulfide along the contactors such that contacting of the gas and the liquid sorbent to treat the gas occurs across walls of the contactors, wherein the contactors incorporate particles distinct in composition from a remainder of the walls to influence wetting properties of the contactors.

2. The method according to claim 1, wherein the particles include carbon nanoparticles.

3. The method according to claim 1, wherein the particles are fluorinated particles.

4. The method according to claim 1, further comprising preparing the hollow-fiber contactors by spinning a composition doped with the particles.

5. The method according to claim 1, wherein the particles form a coating of the contactors.

6. The method according to claim 1, wherein the particles form a coating on an outer surface of the contactors.

7. The method according to claim 1, wherein the particles contribute to surface roughness of the contactors.

8. The method according to claim 1, wherein the sorbent includes an aqueous amine.

9. The method according to claim 1, wherein the sorbent is loaded with the carbon dioxide.

10. The method according to claim 1, further comprising applying a voltage across the contactors to further influence wetting properties of the contactors.

11. The method according to claim 1, wherein size of the particles is between one nanometer and one micron.

12. A method, comprising:
    transferring carbon dioxide from a gas mixture to a liquid sorbent through a first hollow-fiber contactor that incorporates first non-polymeric particles to influence wetting properties of the first hollow-fiber contactor;
    transferring the carbon dioxide from the liquid sorbent to steam through a second hollow-fiber contactor that incorporates second non-polymeric particles to influence wetting properties of the second hollow-fiber contactor; and
    condensing the steam to separate the carbon dioxide transferred to the steam.

13. The method according to claim 12, wherein the particles include carbon nanoparticles.

14. The method according to claim 12, wherein the particles are disposed on sorbent contacting surfaces of the first and second hollow-fiber contactors.

15. The method according to claim 12, wherein walls of the first and second hollow-fiber contactors are formed of a polymeric material and the particles are dispersed on a surface of the polymeric material.

16. A system, comprising:
    a sorption unit having a first hollow-fiber contactor in fluid communication with a sorbent and a mixture containing at least one of carbon dioxide and hydrogen sulfide for transfer of at least one of the carbon dioxide and the hydrogen sulfide through pores of the first hollow-fiber contactor to the sorbent; and
    a desorption unit having a second hollow-fiber contactor in fluid communication with a circulation flow path loop that couples the sorption and desorption units with the sorbent, wherein the first and second hollow-fiber contactors incorporate particles distinct from a remainder of the contactors to influence wetting properties thereof.

17. The assembly according to claim 16, wherein the particles include carbon nanoparticles.

18. The assembly according to claim 16, wherein the particles include carbon nanoparticles and the first and second hollow-fiber contactors further include a hydrophobic polymer material.

19. The assembly according to claim 16, wherein the particles include carbon nanoparticles coated on surfaces of the first and second hollow-fiber contactors along where the first and second hollow-fiber contactors contact the sorbent.

20. The assembly according to claim 16, wherein the mixture contains the carbon dioxide for transfer of the carbon dioxide through the pores of the first hollow-fiber contactor to the sorbent.

* * * * *